(12) United States Patent
Yamamoto et al.

(10) Patent No.: US 6,233,663 B1
(45) Date of Patent: May 15, 2001

(54) MEMORY EXCLUSIVE CONTROL DEVICE AND METHOD THEREFOR

(75) Inventors: Kazushi Yamamoto, Osaka; Yoshiyuki Iwamura, Hirakata; Toshinori Maeda; Toru Kakiage, both of Neyagawa, all of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/049,108

(22) Filed: Mar. 27, 1998

(30) Foreign Application Priority Data

Apr. 2, 1997 (JP) .................................................. 9-083636

(51) Int. Cl.[7] .................................................. G06F 12/02
(52) U.S. Cl. .......................................... 711/165; 711/152
(58) Field of Search .................................. 711/147, 149, 711/150, 152, 165

(56) References Cited

U.S. PATENT DOCUMENTS

| | | | |
|---|---|---|---|
| 4,669,066 | * 5/1987 | Kagawa et al. | 365/229 |
| 4,698,753 | * 10/1987 | Hubbins et al. | 709/209 |
| 4,943,911 | 7/1990 | Kopp et al. | 713/2 |
| 5,065,343 | * 11/1991 | Inoue | 345/512 |
| 5,740,401 | 4/1998 | Hanawa et al. | 395/479 |

FOREIGN PATENT DOCUMENTS

| | | |
|---|---|---|
| 268285 | 5/1988 | (EP) . |
| 5-210640 | 8/1993 | (JP) . |
| 557197 | 8/1993 | (EP) . |
| 8-87481 | 4/1996 | (JP) . |
| 93-16879 | 8/1993 | (KR) . |

OTHER PUBLICATIONS

English Language Abstract of JP 8–87481.

* cited by examiner

Primary Examiner—Kevin L. Ellis
(74) Attorney, Agent, or Firm—Greenblum & Bernstein, P.L.C.

(57) ABSTRACT

In the memory exclusive control device having a CPU-1 accessible to both a common memory and first memory devices, the CPU-1 is prohibited from accessing to the common memory device (105) during OFF state of an access permission flag, and when the access permissive flag ON is established by TCS (111), the gate of the access permitting unit (103) is opened to thereby permit the CPU-1 to access to the common memory device (105). Thus, the memory exclusive control can be realized for transferring a desired program to be processed to the address space of the first memory device, allowing omission of a third memory device.

16 Claims, 9 Drawing Sheets

*Fig.4*

| PROGRAMS | SIZE | ADDRESS ON COMMON MEMORY | ADDRESS ON 1st MEMORY | ADDRESS ON n-th MEMORY |
|---|---|---|---|---|
| p1 | 0x40 | 0x80000054 | 0x4000008 | 0x......... |
| p2 | 0x10 | 0x80000094 | 0x4000008 | 0x......... |
| p3 | 0x10 | 0x800000a4 | 0x4000008 | 0x......... |
| p4 | 0x10 | 0x800000b4 | 0x4000008 | 0x......... |
| ..... | | | | |

MEMORY EXCLUSIVE CONTROL DEVICE AND METHOD THEREFOR

BACKGROUND OF THE INVENTION

1. Field of the Invention

The present invention generally relates to a memory control device for use in a data processing system, and in particular to a memory exclusive control device and method therefor in a data multiprocessor system for loading an initialization program and the like.

2. Description of the Prior Art

In a conventional data processing system for use in such as a data recording/reproducing system and the like using a data recording medium, there are widely used various kinds of recording medium in a data recording/reproducing player, for example, a compact disk (CD), mini disk (MD), digital video disk (DVD), PD, MO and the like. In operating a disk player, when e.g. an optical disk is rotated during a recording/reproducing operation, there have been employed various control systems, for example, a spindle motor servo-control system in the disk player for servo-controlling a spindle motor, a focus/tracking servo-control system for obtaining focus and tracking conditions of a light beam spot when using an optical disk, and error correction and data compression control systems and the like.

In order to effect such various control systems, a memory exclusive control device is employed in a data multiprocessor system for loading an initialization program.

The following describes a conventional memory exclusive control device serving as an initializing program loading device for use in a data processing system of a multiprocessor type.

FIG. 8 shows a conventional construction of a memory exclusive control device as an initializing program loading device of a multiprocessor system in a data recording/reproducing system, where the data processing system includes a first processor 815 for data processing of demodulation, error correction and the like control, a second processor 816 for focus/tracking and disk-rotation servo-controls and further includes a common memory device 805 which are interconnected via data bus lines.

The first processor 815 includes a first microprocessor 801 (referred to as "CPU-1" hereinafter), a first memory device 802 of RAM, a third memory device 803 of ROM which is different in type from the first memory device, a bus control unit 804, an interface 807 and a direct memory access (referred to as "DMA" hereinafter), where the CPU-1 is accessible to the common memory device 805 and to the first memory device 802. The CPU-1 is also accessible to the third memory device 803 having a specified program previously loaded thereon. The DMA 910 is interconnected with a hostcomputer.

The second processor 816 includes a second microprocessor 806 (referred to as "CPU-2" hereinafter) and a second memory device 808 of ROM, where the CPU-2 is accessible to the common memory device 805 and to the second memory device 808. The CPU-2 is connected to a medium detecting portion 817 which is comprised of a servo microcomputer compatible to various kinds of disks or the like medium so that the CPU-2 detects a type of a recording medium of e.g. a disk loaded to the medium detecting portion 817.

The bus control unit 804 provided in the first processor 815 controls the bus lines for data transfer by a time sharing method between the common memory device 805 and the CPU-1 and between the common memory device 805 and the CPU-2. The interface 807 provided in the first processor B15 mutually controls the accesses of the CPU-1 and CPU-2.

The second memory device 808 provided in the second processor 816 includes a first program transfer processing unit 809 (referred to as "1st PTC" hereinafter), a transfer completion setting unit 811 (referred to as "TCS" hereinafter), a second program transfer processing unit 812 (referred to as "2nd PTC" hereinafter), and a processing program storage portion 814 (referred to as "PPS" hereinafter). The 1st PTC 809 stores 1st transfer program for transferring the programs on the second memory device 808 to the common memory device 805. When the 1st transfer program is executed and completed, in other words, when the transfer of the programs on the second memory device 808 to the common memory device 805 is completed, the TCS 811 establishes a transfer completion indicative value on a transfer completion variable 810 (referred to as "TCV" hereinafter). The TCV 810 indicates whether or not the data transfer from the second memory device to the common memory device is completed. The 2nd PTC 812 stores a 2nd transfer program for transferring a program on the common memory device 805 to the first memory device 802. The PPS 814 stores processing programs p1, p2, . . . for the CPU-1, which the programs p1, p2, . . . correspond to the types of the recording medium to be loaded, respectively.

Similarly, the common memory device 805 is also provided with a 2nd PTC 812', PPS 814' and TCV 810', which are corresponding to the 2nd PTC 812, PPS 814 and TCV 810 provided in the second memory device 808, respectively.

The third memory device 803 is provided with a transfer completion monitor processing unit 813 (referred to as "TCM" hereinafter) having a monitor processing program for monitoring whether or not the transfer of the programs from the second memory device to the common memory device is completed, with reference to the TCV 810 by a time sharing method. When the transfer completion indicative value of e.g. "1" is established in the TCV 810 by the TCS 811, the TCM 813 detects that the program transfer onto the common memory device is completed. Then, the execution of the 2nd transfer program, which has been transferred to the 2nd PTC 812' on the common memory device 805, is started, and then the program on the common memory device is transferred to the first memory device 802. Thus, the processing program for the CPU-1 now stored in the PPS 814' on the common memory device 805 is transferred to a PPS 814" on the first memory device 802 and then the processing program for the CPU-1 is started to be executed on the first memory device 802.

FIG. 9 shows an interconnection in detail between the bus control unit 804 and the CPU-1, CPU-2 and various memories in the conventional construction.

In this construction shown in FIG. 9, when the CPU-1 801 accesses to the common memory device 805 of DRAM, the CPU-1 transmits a bus request signal to an adjustment unit 900 via a signal line BR1. In response thereto, the adjustment unit 900 transmits a bus release signal to the CPU-1 via a signal line BG1. Upon transmission of the bus release signal, the address buses 901, 905 and data buses 902, 906 are opened to allow the CPU-1 to transfer the data to the DRAM 805, that is, allowing read/write of the data. Thus, the CPU-1 accesses to the DRAM 805 via the bus control unit 804 to thereby execute the programs on the DRAM 805 by fetching the programs.

When the CPU-2 accesses to the DRAM 805 for transferring the processing programs from the second memory device 808, the CPU-2 transmits a bus request signal to the adjustment unit 900 via a signal line BR2. In response thereto, the adjustment unit 900 transmits a bus release signal to the CPU-2 via a signal line BG2. Thus, the CPU-2 transfers the data from the second memory device 908 to the DRAM 805 via the bus control unit 804.

Similarly, DMA transmits a DMA request signal to the adjustment unit 900 via a signal line BR3. In response thereto, the adjustment unit 900 transmits a bus release signal to the DMA via a signal line BG3. Thus, the DMA transfers the data to the DRAM 805 via the bus control unit 804.

With reference to whether or not any of the bus request signals is present on the signal lines BR1, BR2 and BR3, the corresponding bus release signal is transmitted to any of the CPU-1, CPU-2 or DMA by switching the address and data buses by a method of time sharing.

When the bus request signals on the signal lines BR1 and BR2 are simultaneously transmitted to the adjustment unit 900 from the CPU-1 and CPU-2, the adjustment unit 900 alternately switches the outputs of the signal lines BG1 and BG2. Thus, the access from the CPU-1 to the DRAM 805 and the data transfer from the CPU-2 to the DRAM 805 are alternately executed by a method of time sharing.

It is noted here that the explanation is made on the condition that the conventional construction has an arrangement of allocating the respective process execution programs as shown in FIG. 11 in the -initialization state of the data processing system. In more detail, the second memory device 808 is provided with the processing programs stored in the 1st PTC 809, TCS 811, 2nd PTC 812, PPS 814 and TCV 810 at the initialization state while the third memory device 803 is provided with the TCM 813, whereas the first memory device 802 and the common memory device 805 have no program previously stored at the initialization state of the system.

The following describes an operation of the above-described conventional memory exclusive control device with reference to FIGS. 10 to 13.

In the flow chart of FIG. 10, the system is reset in step S101 to start the program, and then the processes of steps S102 and S106 are simultaneously started in parallel.

In step S102, the CPU-2 806 accesses to the second memory device 808 so that the programs on the second memory device 808 is executed. Then, in step S103, the programs on the 2nd PTC 812 and the PPS 814 are transferred from the second memory device 808 to the common memory device 805.

Then, in step S104, it is judged whether or not the transfer of the programs on the PPS 814 to the common memory device is completed, and when the completion is detected, the TCS 811 establishes a transfer completion indicative value of e.g. "1" on the TCV 810' on the common memory device 805 in step S105, indicating that the data transfer from the second memory device to the common memory device is completed.

Meanwhile, in step S106, the CPU-1 801 accesses to the third memory device 803 so that the program previously stored on the third memory device is executed.

In step S107, the TCM 813 in the third memory device 803 detects whether or not the transfer of the program from the second memory device to the common memory device is completed, with reference to the TCV 810' on the common memory device 805, and the detecting operation by the TCM 813 is repeated until the transfer completion indicative value of e.g. "1" is established in the TCV 810'. When the transfer completion indicative value is established in the TCV 810' by the TCS 811, the processing program allocation in the memories is as shown in FIG. 12.

At this stage shown in FIG. 12, the execution of the 2nd transfer program having been transferred onto the common memory device 805 is started in step S108. Thus, the program of executing the process for the CPU-1 now present in the PPS 814' on the common memory device 805 is transferred to the first memory device 802, which the arrangement of allocating the programs is as shown in FIG. 13.

At this stage, the second transfer program on the 2nd PTC 812 or 812' has fixed values written thereon allocated to the head address on the common memory device and to a target head address on the first memory device previously written on the practical program as the fixed values, and the program data amount corresponding to the addresses and size thereof is transferred to the first memory device 802 from the common memory device 805. It is noted here that "0x . . . " indicates a hexadecimal digit.

Then, when the transfer of the program of executing the process by the CPU-1 from the common memory device 805 to the first memory device 802 is completed, the program of executing the process for the CPU-1 now present on the first memory device is started to be executed in step S109 in accordance with the detected program corresponding to the type of the recording medium loaded to the medium detecting portion 817.

As described above, in the conventional construction of the memory exclusive control device, it is essentially necessary to provide a third memory device of ROM which is different in type from the first memory device of RAM.

Moreover, when the program present on the common memory device is transferred to the first memory device, it is necessary to previously determine the size of the program, address on the common memory device to store the program before transfer thereof and address on the first memory device to allocate the program after transfer thereof.

SUMMARY OF THE INVENTION

The present invention has been developed with a view to substantially solving the above described disadvantages. Accordingly, an essential objective of the present invention is therefore to provide an improvement of a memory exclusive control device and method therefor for use in a data processing system.

In order to achieve the above objective, according to the present invention, a memory exclusive control device for use in a data processing system having a plurality of microprocessors interconnected via data buses, comprises:

a primary memory device for storing a data processing program to be executed;

a common memory device, which can be accessed in common by said plurality of microprocessors, for temporarily storing the data processing program to be transferred to said primary memory device;

a primary microprocessor which is accessible to both the common memory device and the primary memory device for transfer the data processing program from the common memory device to the primary memory device via the data buses; and a bus control unit which includes an access permitting unit for permitting the primary microprocessor to access to the common memory device to thereby control the data transfer on the buses.

The access permitting unit controls the data transfer on the buses by a method of time sharing with reference to an access ON flag.

The memory exclusive control device further comprises a secondary microprocessor along with a secondary memory device for initially storing the data processing program and other command programs, where the secondary microprocessor is accessible both to the common memory device and to the second memory device.

The secondary memory device is provided with a first program transfer processing unit having a first transfer program for executing the transfer of the programs on the secondary memory device to the common memory device.

The secondary memory device is further provided with a transfer completion setting unit, and when the transfer of the programs on the second memory device to the common memory device is completed, then the transfer completion setting unit establishes the ON flag indicative of the data transfer completion, on the register of the interface to thereby open the gate of the access permitting unit to permit the primary microprocessor to access to the common memory device via the bus control unit.

Furthermore, according to another aspect of the present invention, a memory exclusive control method for data transfer on buses in a data-processing system, comprises the steps of:

temporarily storing a data processing program in a common memory device to be transferred to a primary memory device;

permitting a primary microprocessor to access to the common memory device to thereby control the data transfer on the buses;

transferring the data processing program from the common memory device to the primary memory device via the buses; and storing the data processing program to be executed on the primary memory device.

In this method, when the transfer completion indicative ON flag is established, the method further comprises the step of obtaining a size of a program to be transferred to the primary memory device, head address on the common memory device storing the program and head address on the primary memory device for executing the program, whereby, based on the obtained size of the program, head address on the common memory device storing the program and head address on the primary memory device for executing the program, the data amount of the program corresponding to the size thereof is transferred from the head address on the common memory device to the head address on the first memory device.

Therefore, according to the aspect of the present invention, the primary microprocessor is prohibited from accessing to the common memory device during the OFF state of the access permission flag, i.e., in the state that the gate of the access permitting unit is in the switched-off condition. When the access permissive flag ON is established by the transfer completion setting unit, the gate of the access permitting unit is opened to thereby permit the primary microprocessor to access to the common memory device. Thus, the memory exclusive control can be realized for transferring the desired program to be processed to the address space of the primary memory device which can be accessed only by the primary microprocessor without providing a third memory device as disclosed in the conventional data processing system.

BRIEF DESCRIPTION OF THE DRAWINGS

These and other objects and features of the present invention will become clear from the following description taken in conjunction with the preferred embodiments thereof with reference to the accompanying drawings, in which:

FIG. 4 is a diagram showing an overlay table used in the present invention;

DETAILED DESCRIPTION OF THE PREFERRED EMBODIMENTS

Figure 1:
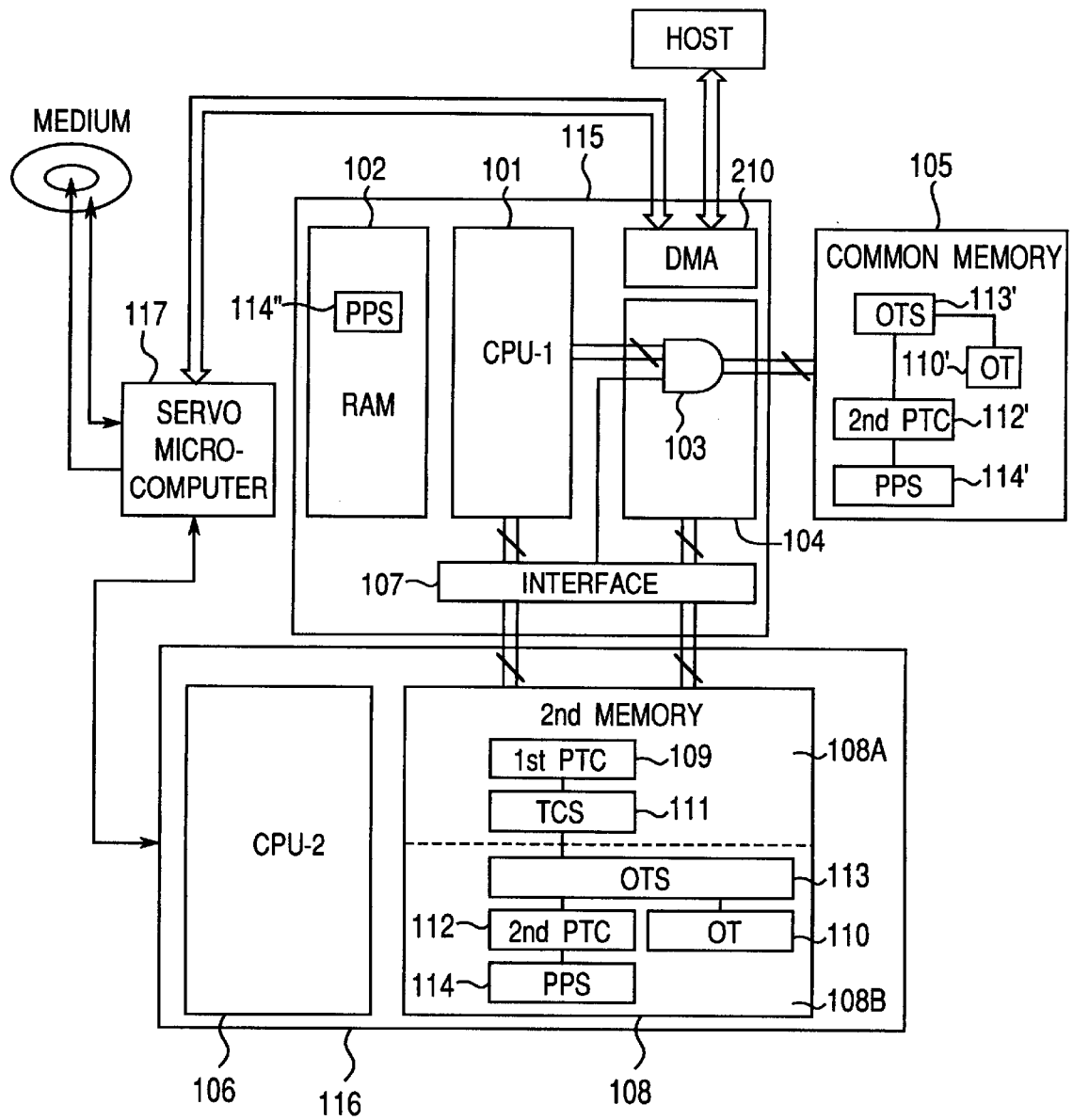
FIG. 1 is a block diagram showing a construction of a memory exclusive control device according to the present invention.

Before the description proceeds, it is to be noted that, since the basic structure of the preferred embodiment is in common to the conventional one, like parts are designated by the like reference numerals throughout the accompanying drawings.

Hereinbelow, a preferred embodiment of a memory exclusive control device according to the present invention is described with reference to FIGS. 1 through 7.

FIG. 1 shows a construction of the memory exclusive control device serving as an initializing program loading device in a multiprocessor system of, for example, a data recording/reproducing system or the like data processing system. The multiprocessor system includes a first processor 115 for data processing of such as demodulation, error correction and the like control, a second processor 116 for such as focus/tracking control and e.g. disk-rotation servo-control, and further includes a common memory device 105 which are operatively interconnected via data bus lines.

The first processor 115 includes a first microprocessor 101 (referred to as "CPU-1" hereinafter), a first memory device 102 of RAM type, a bus control unit 104, DMA 210 and further includes an interface 107, where the CPU-1 is accessible to the common memory device 105 and to the first memory device 102. The DMA 210 is further interconnected with a hostcomputer for controlling the entire systems.

The second processor 116 includes a second microprocessor 106 (referred to as "CPU-2" hereinafter) and a second memory device 108 of ROM type, where the CPU-2 is accessible to the common memory device 105 and to the second memory device 108. The CPU-2 is connected to a medium detecting portion 117 which is comprised of a servo microcomputer compatible to various kinds of data recording media such as disks or the like medium so that the CPU-2 detects a type of a recording medium of e.g. a disk medium loaded to the medium detecting portion 117.

The bus control unit 104 provided in the first processor 115 further includes an access permitting unit 103 which is comprised of e.g. an AND gate. The AND gate 103 is normally switched off, i.e., closed to prevent the CPU-1 from accessing to the common memory device 105 in the initializing state. The bus control unit 104 controls the data transfer on the buses by a method of time sharing to select any one of the data transfer between the common memory device 105 and the CPU-1 and between the common memory device 105 and the CPU-2. The interface 107 provided in the first processor 115 has a register for establishing an access ON flag to mutually control the accesses for the CPU-1 and CPU-2.

The second memory device 108 of the second processor 116 is comprised of a first memory section 108A and a second memory section 108B. The first memory section 108A is provided with a first program transfer processing unit 109 (referred to as "1st PTC" hereinafter) and a transfer completion setting unit 111 (referred to as "TCS" hereinafter). The second memory section 108B is provided with a second program transfer processing unit 112 (referred to as "2nd PTC" hereinafter), a processing program storage portion 114 (referred to as "PPS" hereinafter) and an overlay table search portion 113 (referred to as "OTS" hereinafter) along with an overlay table 110. The overlay table contains plural sets of information for a plurality of data processing programs where each set of information has a plurality of address information for each program having a specified size.

The 1st PTC 109 has a 1st transfer program for executing the transfer of programs on the second memory section 108B of the second memory device 108 to the common memory device 105. When the 1st transfer program is carried out and the transfer of the programs on the second memory device 108 to the common memory device 105 is completed, then the TCS 111 establishes an ON flag indicative of the data transfer completion, on the register of the interface 107 to thereby open the gate of the access permitting unit 103 to permit the CPU-1 to access to the common memory device 105 via the bus control unit 104.

Thus, the flag established by the TCS 111 indicates whether or not the program transfer from the second memory device to the common memory device is completed. The OTS 113 has a program to search suitable one of the programs on the overlay table 110 when the CPU-1 is permitted to access to the common memory by detecting the established ON flag.

The 2nd PTC 112 stores a program of 2nd transfer program for executing the transfer of the program on the common memory device 105 to the first memory device 102. The PPS 114 stores various processing programs p1, p2, . . . to be selectively executed on the first memory device 102 by the CPU-1, which the programs p1, p2, . . . correspond to the types of the recording media to be compatibly loaded to the medium detecting portion 117, respectively.

The common memory device 105 is similarly provided with a 2nd PTC 112', PPS 114' and OTS 113', which are corresponding to the 2nd PTC 112, PPS 114 and OTS 113 provided on the second memory device 108, respectively.

On the common memory device 105, the OTS 113' temporarily stores the program of searching the overlay table 110, which the search operation is executed when the CPU-1 is permitted to access to the common memory by detecting the establishment of the ON flag. The 2nd PTC 112' stores the 2nd transfer program which has been transferred from the 2nd PTC 112 of the second memory device 108 for executing the transfer of the program on the common memory device 105 to the first memory device 102. The PPS 114' temporarily stores the processing programs p1, p2, . . . which have been transferred from the PPS 114 of the second memory device 108 to be selectively executed on the first memory device 102 by the CPU-1.

Similarly, the first memory device 102 is provided with a PPS 114" which stores the processing programs p1, p2, . . . transferred from the PPS 114' of the common memory device 105 to be selectively executed in accordance with the type of the loaded medium.

When the transfer completion indicative flag ON is established on the register by the TCS 111, it is judged that the program transfer onto the common memory device is completed and the gate 103 is opened to permit the CPU-1 to access to the common memory device 105. Then, the execution of the 2nd transfer program, which has been transferred from the second memory device 108 to the 2nd PTC 112' on the common memory device 105, is started so that the program on the common memory device is transferred to the first memory device 102. Thus, selected one of the processing programs p1, p2, . . . for the CPU-1 now stored in the PPS 114' on the common memory device 105 is transferred to the PPS 114" of the first memory device 102 and then execution thereof is started by the CPU-1.

Figure 2:
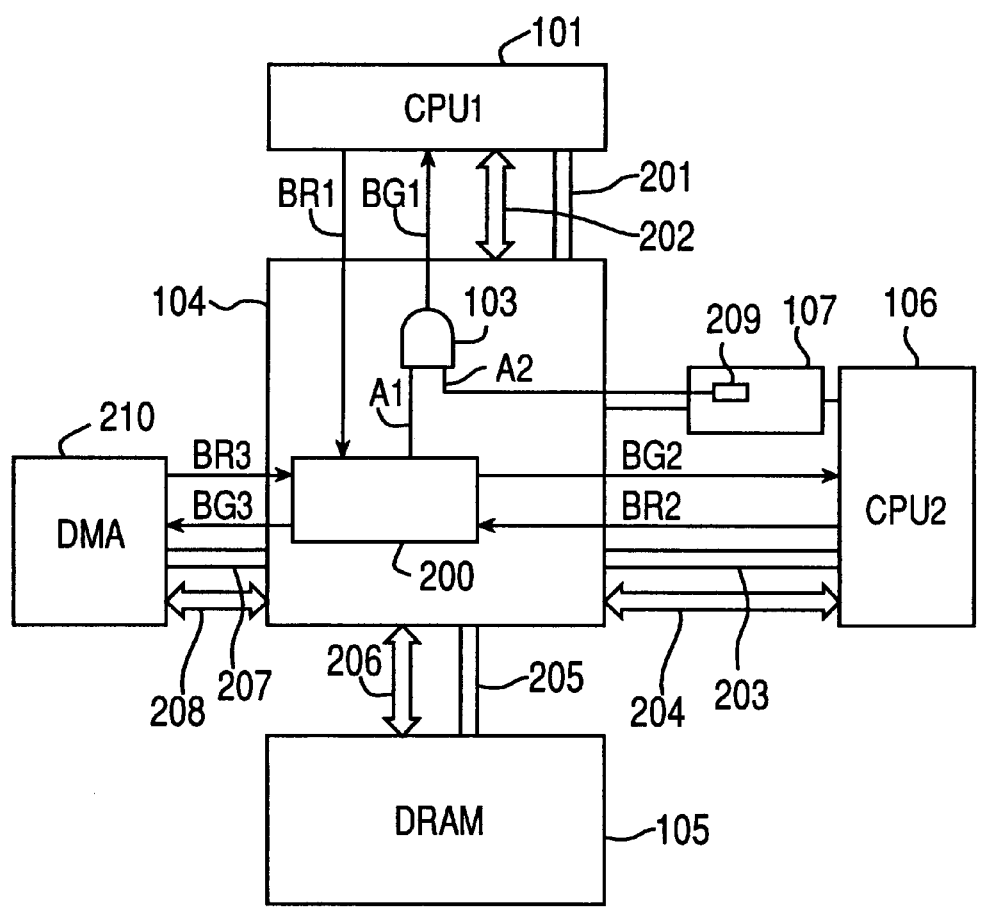
FIG. 2 is a block diagram showing an interconnection relationship of a bus control unit of the present invention.

FIG. 2 shows an interconnection relation in detail between the bus control unit 104 and the CPU-1, CPU-2 and various memories in the construction of the present embodiment, which is similar to that of the conventional one except for providing the access permitting unit 103 of AND gate.

In this construction shown in FIG. 2, when the CPU-1 accesses to the common memory device 105 of DRAM, the CPU-1 transmits a bus request signal to an adjustment unit 200 via a signal line BR1. In response thereto, the adjustment unit 200 transmits a bus release signal to the CPU-1 via a signal line BG1 by way of the AND gate 103. The AND gate 103 has two input signals, i.e., first signal line A1 connected with the adjustment unit 200 and second signal line A2 connected with the register 209 of the interface 107 for the CPU-2, and when the two signals are both generated and input to the AND gate, the AND gate generates the bus release signal on the signal line BG1 to be applied to the CPU-1. While the second input signal A2 from the register 209 is of OFF state, the bus release signal on the signal line BG1 is of OFF state to the CPU-1.

When the CPU-2 accesses to the DRAM 105 for transferring the programs from the second memory device 108, the CPU-2 transmits a bus request signal to the adjustment unit 200 via a signal line BR2. In response thereto, the adjustment unit 200 transmits a bus release signal to the CPU-2 via a signal line BG2. Thus, the CPU-2 transfers the data from the second memory device 108 to the DRAM 105 via the bus control unit 104.

Similarly, DMA 210 transmits a DMA request signal to the adjustment unit 200 via a signal line BR3. In response thereto, the adjustment unit 200 transmits a bus release signal to the DMA 210 via a signal line BG3. Thus, the DMA transfers the data to the DRAM 105 via the bus control unit 104.

In the meanwhile, when the data transfer to the DRAM 105 by the CPU-2 is completed, the ON flag indicative of the data transfer completion is written in the register 209 of the interface 107, and the second input signal A2 from the register 209 is turned on. Accordingly, the bus release signal on the signal line BG1 is transmitted to the CPU-1 via the AND gate 103.

Upon transmission of the bus release signal on the signal line BG1, the address buses 201, 205 and data buses 202, 206 are opened to allow the CPU-1 to transfer the data to the DRAM 105, that is, allowing read/write of the data on the DRAM 105. Thus, the CPU-1 accesses to the DRAM 105 via the bus control unit 104 to thereby execute the programs on the DRAM 105 by fetching the programs.

Figure 5:
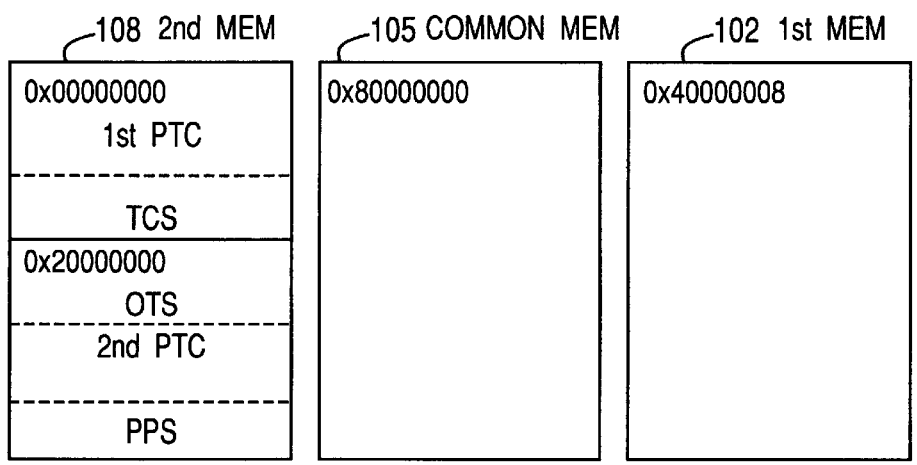
FIG. 5 is an explanatory view showing an allocation of processing programs at an initializing state of the present invention.
Figure 6:
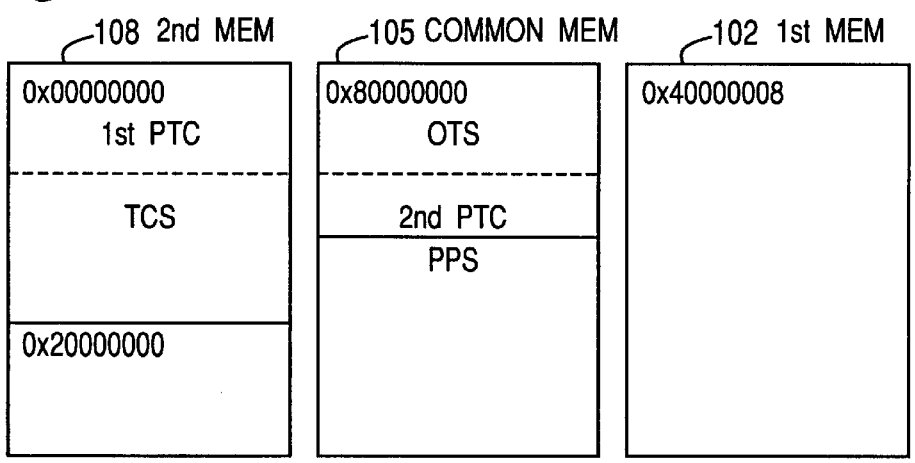
FIG. 6 is an explanatory view showing an allocation of processing programs at a state after transferred to a common memory device of the present invention.

It is noted here that the explanation is made on the condition that the construction of the device has a memory storage allocation of the respective process execution programs as shown in FIGS. 1 and 5 in the initialization state of the data processing system. In more detail, as shown in FIG. 5, the second memory device 108 is provided with the processing programs stored in the 1st PTC 109, TCS 711, 2nd PTC 112, PPS 114 and OTS 113 along with the overlay table 110 at the initialization state, whereas the first memory device 102 and the common memory device 105 have no program previously stored at the initialization state of the system.

At this stage, the second memory device 108 has its address numbers from 00000000 allocated thereto, the common memory device 105 has its address numbers from 80000000 allocated thereto and the first memory device 102 has its address numbers from 40000000 allocated thereto.

The following describes an operation of the above-described memory exclusive control device with reference to FIGS. 1 to 7.

Figure 3:
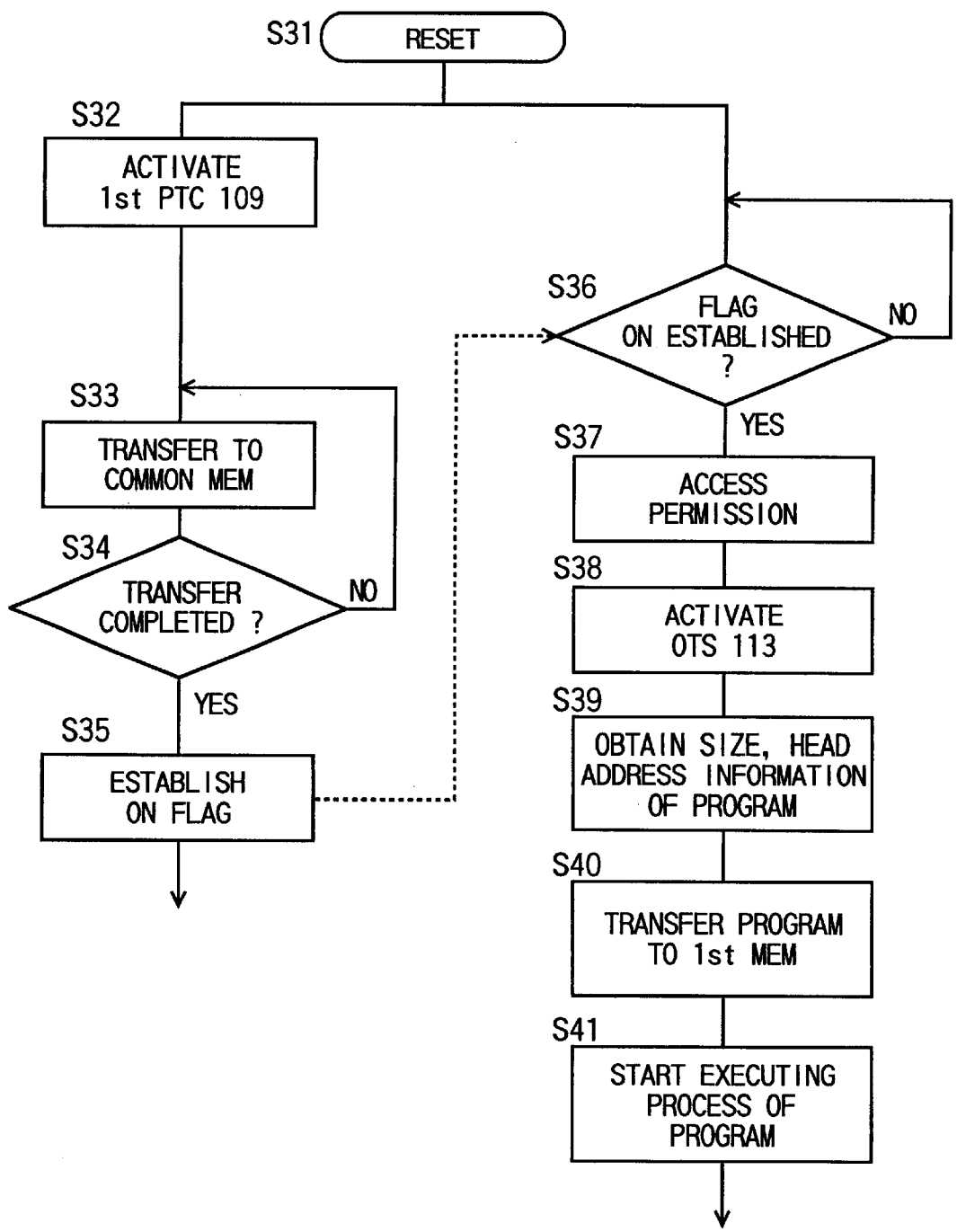
FIG. 3 is a flow chart explaining an operation of the present invention.

In the flow chart of FIG. 3, the system is initially reset in step S31 to start the program of the system, and then the processes of steps S32 and S36 are simultaneously started in parallel as below. At this stage, the memory storage allocation of the programs is in the state shown in FIG. 5.

In step S32, the CPU-2 106 accesses to the second memory device 108 to activate the 1st PTC 109 so that the execution of the programs stored on the second memory device 108 is started. Then, in step S33, the program stored in the 2nd PTC 112, program stored in the OTS 113 and the programs on the PPS 114 are transferred from the second memory device 108 to the corresponding portions on the common memory device 105. At this stage, the memory storage allocation of the programs is in the state shown in FIG. 6.

Then, in step S34, it is judged by the TCS 111 whether or not the transfer of the programs on the second memory device 108 to the common memory device 105 is completed, and when the judgment is Yes, i.e., when the completion is detected, the TCS 111 establishes the ON flag, which is indicative of the transfer completion, on the register of the interface 107 in step S35, indicating that the data transfer from the second memory device to the common memory device is completed. Thus, the gate 103 is opened with reference to the established ON flag to thereby permit the CPU-1 to access to the common memory 105. When the judgment is No in step S34, the process returns to the step S33 to be repeated.

Meanwhile, in step S36, it is judged whether or not the access permission flag ON is established, and when judged Yes, the gate of the access permitting unit 103 is opened in step S37 to permit the CPU-1 to access to the common memory 105. When the judgment is No in step S36, the CPU-1 remains the normally prohibited state of the access and the process of step S36 is repeated.

Subsequent to the establishment of the ON flag, the CPU-1 activates the OTS 113' via the bus control unit 104 in step S38 to execute the search on the overlay table 110. Thus, in step S39, the OTS 113' obtains a size of a program to be transferred to the first memory device 102, head address on the common memory device storing the program and head address on the first memory device for executing the program. At this stage, when e.g. a program p1 is detected among the various types of the recording media as shown in FIG. 4, the obtained information has a size of the program to be transferred is 0x40, address of 0x80000054 on the common memory device and address of 0x40000008 on the first memory device.

Figure 7:
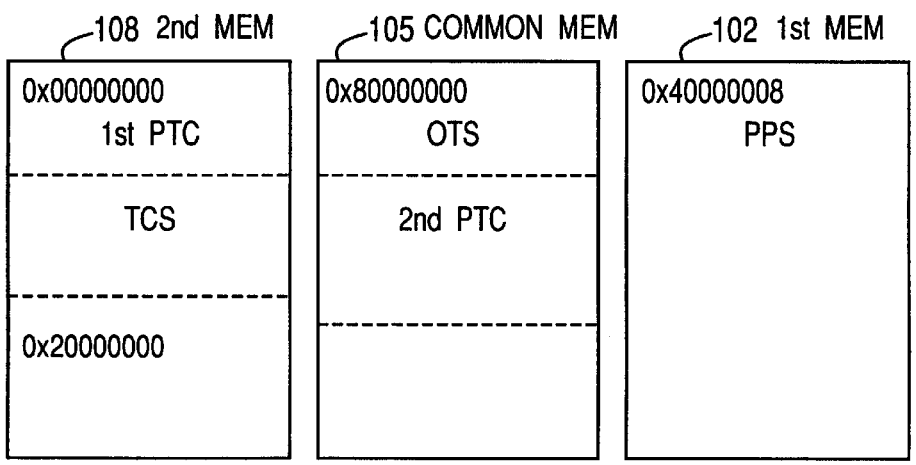
FIG. 7 is an explanatory view showing an allocation of processing programs in a state after transferred to a first memory device of the present invention.
Figure 8:
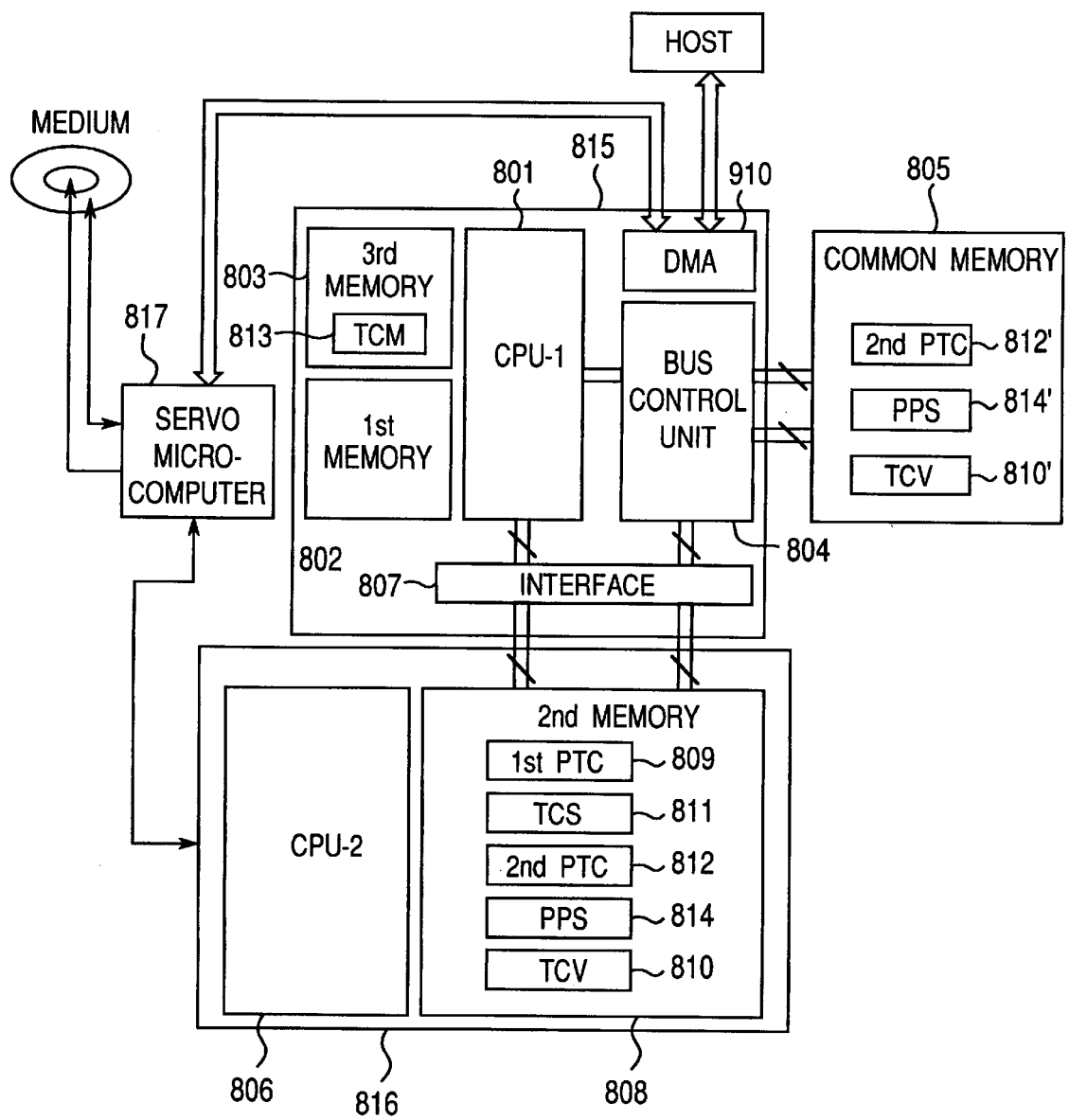
FIG. 8 is a block diagram showing a construction of a conventional memory exclusive control device.
Figure 9:
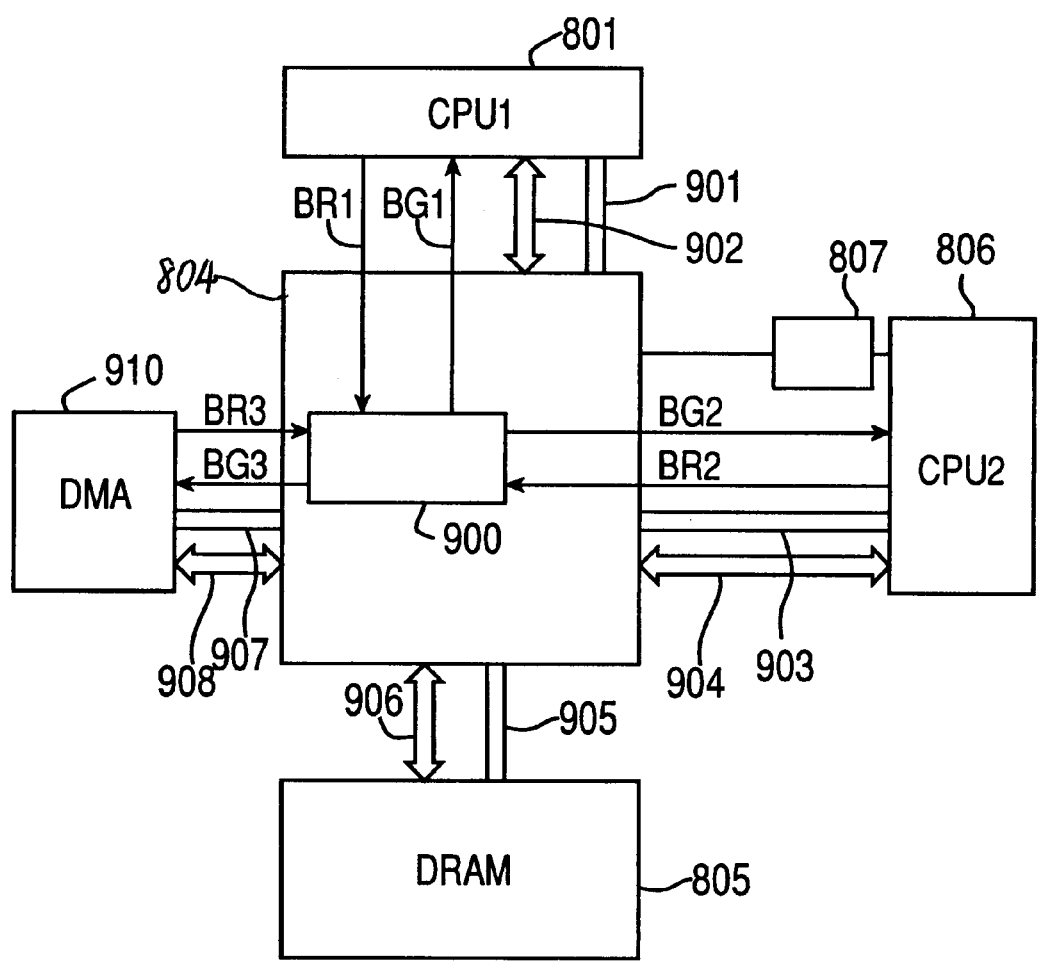
FIG. 9 is a block diagram showing an interconnection relationship of a bus control unit of FIG. 8.
Figure 10:
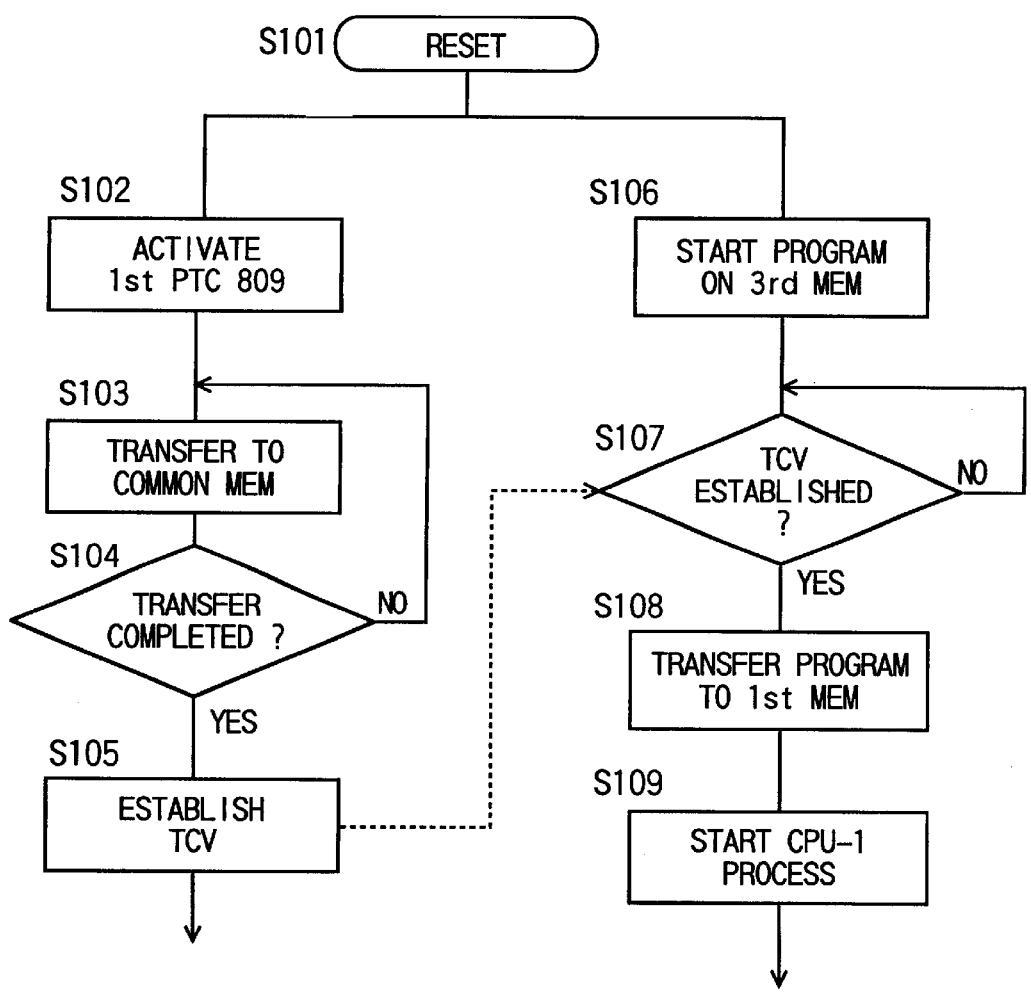
FIG. 10 is a flow chart explaining an operation of the conventional construction.
Figure 11:
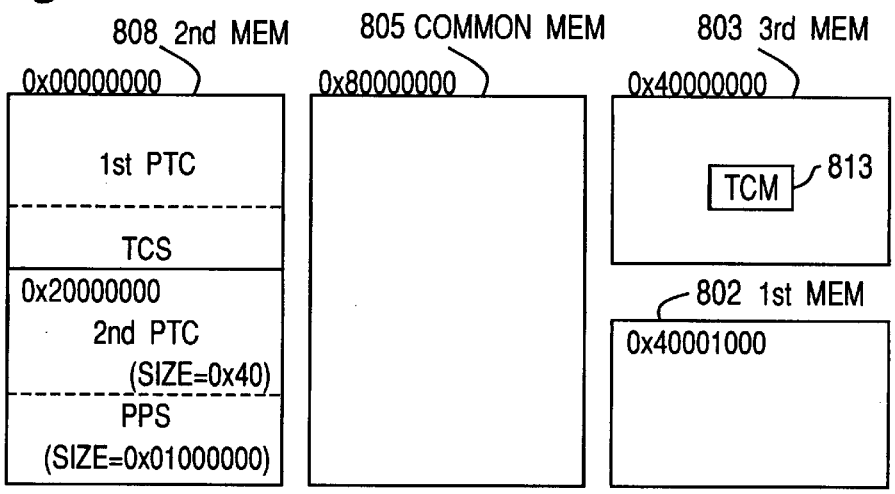
FIG. 11 is an explanatory view showing an allocation of processing programs at an initializing state of the conventional construction.
Figure 12:
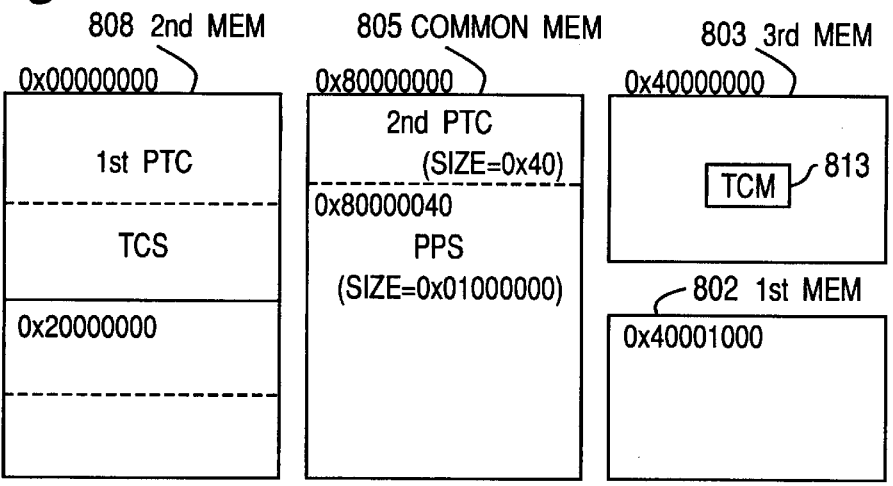
FIG. 12 is an explanatory view showing an allocation of processing programs at a state after transferred to a common memory device of the conventional construction.
Figure 13:
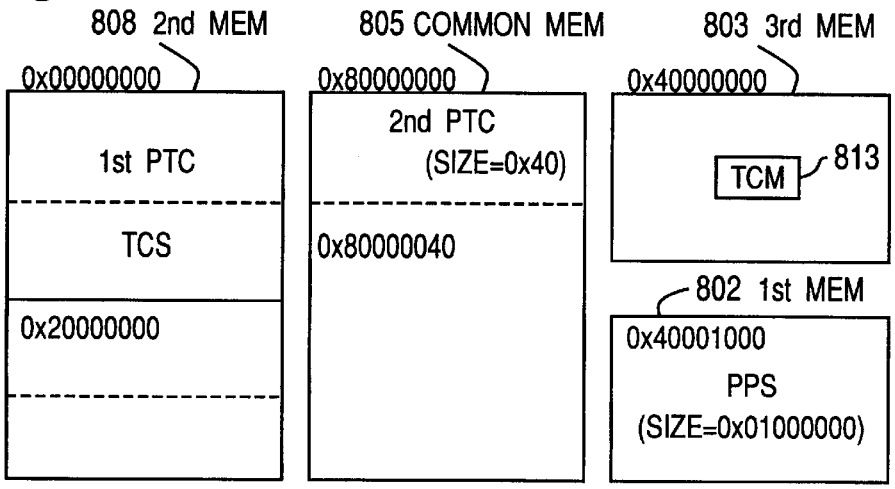
FIG. 13 is an explanatory view showing an allocation of processing programs in a state after transferred to a first memory device of the conventional construction.

Next, in step S40, the CPU-1 activates the 2nd PTC 112' to start the execution of the 2nd transfer program having been transferred from the second memory device to the PPS 114' on the common memory device 105. Thus, the program of executing the process for the CPU-1 now present in the PPS 114' on the common memory device 105 is transferred to the first memory device 102. At this stage, based on the size of the program to be transferred to the first memory device 102, head address on the common memory device storing the program and head address on the first memory device for executing the program, the data amount of the program corresponding to the size thereof is transferred from the head address on the common memory device 105 to the head address on the first memory device 102, which the allocation of the programs in the memory storage sections is shown in FIG. 7.

Next, in step S41, when the transfer of the program of executing the process by the CPU-1 from the common memory device 105 to the first memory device 102 is completed, the CPU-1 activates the PPS 114" on the first memory device 102 to start the program of executing the process by the CPU-1 now present on the first memory device in accordance with the detected program corresponding to the recording medium loaded to the medium detecting portion 117.

As described above, in the memory exclusive control device according to the present invention, the CPU-1 is prohibited from accessing to the common memory device 105 during the OFF state of the access permission flag, i.e., in the state that the gate of the access permitting unit 103 is in the closed condition. When the access permissive flag ON is established by the TCS 111, the gate of the access permitting unit 103 is opened to thereby permit the CPU-1 to access to the common memory device 105. Thus, the memory exclusive control can be realized for transferring the desired program to be processed to the address space of the first memory device which can be accessed only by the CPU-1 without providing a third memory device as disclosed in the conventional data processing system.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A memory exclusive control device for use in a data processing system having a plurality of microprocessors interconnected via data buses, the device comprising:

a primary memory device that stores a data processing program to be executed;

a common memory device that can be accessed in common by the plurality of microprocessors and temporarily stores the data processing program to be transferred to the primary memory device;

a secondary memory device that initially stores the data processing program to be transferred to the common memory device and a transfer program for transferring the data processing program from the common memory device to the primary memory device;

a primary microprocessor that is accessible to both the common memory device and the primary memory device;

a secondary microprocessor that, along with the secondary memory device, transfers the data processing program and the transfer program from the secondary memory to the common memory device, and outputs a signal indicating completion of transferring the data processing program and the transfer program to allow the primary processor access to the common memory device; and a bus control unit that includes an access permitting unit for permitting the primary microprocessor access to the common memory device in accordance with the signal output by the secondary microprocessor, to control the data transfer on the data buses, the primary microprocessor executing the data transfer program stored in the common memory device, without transferring the transfer program to the primary memory device, to transfer the data processing program from the common memory device to the primary memory device via the data buses, and that executes the data processing program stored in the primary memory device.

2. The memory exclusive control device as claimed in claim 1, wherein the access permitting unit comprises an AND gate which is normally switched off to prohibit the primary microprocessor from accessing the common memory device, and is switched on in accordance with the signal from the secondary microprocessor.

3. The memory exclusive control device as claimed in claim 1, wherein the access permitting unit controls the data transfer on the buses by time sharing with reference to an access ON flag to be established by the signal.

4. The memory exclusive control device as claimed in claim 1 further comprising an interface having a register for storing an access ON flag to be established by the signal.

5. The memory exclusive control device as claimed in claim 1, wherein the secondary memory device is provided with a first program transfer processing unit having a first transfer program for executing the transfer of the data processing program and the transfer program on the secondary memory device to the common memory device.

6. The memory exclusive control device as claimed in claim 1, wherein the secondary memory device is provided with a processing program storage portion for storing a plurality of data processing programs to be selectively executed on the primary memory device by the primary microprocessor.

7. The memory exclusive control device as claimed in claim 6, wherein the common memory device temporarily stores the data processing program transferred from the processing program storage portion of the secondary memory device to be selectively executed on the primary memory device.

8. A memory exclusive control device for use in a data processing system having a plurality of microprocessors interconnected via data buses, the device comprising:

a primary memory device that stores a data processing program to be executed;

a common memory device, which can be accessed in common by said plurality of microprocessors, and that temporarily stores the data processing program to be transferred to said primary memory device;

a primary microprocessor which is accessible to both the common memory device and the primary memory device and that transfers the data processing program from the common memory device to the primary memory device via the data buses;

a bus control unit which includes an access permitting unit that permits the primary microprocessor access to the common memory device to control the data transfer on the buses by time sharing with reference to an access ON flag;

an interface having a register that stores the access ON flag, an output of the register connecting to the bus control unit and having no connection to a reset of the primary microprocessor; and a secondary memory device provided with a transfer completion setting unit, and when transfer of the data processing program and a transfer program from the secondary memory device to the common memory device is completed, the transfer completion setting unit establishes the access ON flag indicative of completion of the transfer, on the register of the interface, without connection to the reset of the primary microprocessor, to open a gate of the access permitting unit to permit the primary microprocessor access to the common memory device via the bus control unit, the transfer program transferring the data processing from the common memory to the primary memory.

9. The memory exclusive control device as claimed in claim 8, wherein when the transfer completion indicative flag ON is established on the register by the transfer completion setting unit, an AND gate is opened to permit the primary microprocessor access to the common memory device, whereby one of a plurality of processing programs stored on the common memory device is selectively transferred to the primary memory device and then execution thereof is started by the primary microprocessor.

10. A memory exclusive control device for use in a data processing system having a plurality of microprocessors interconnected via data buses, the device comprising:

a primary memory device that stores a data processing program to be executed;

a common memory device, which can be accessed in common by the plurality of microprocessors, and that temporarily stores the data processing program to be transferred to the primary memory device;

a primary microprocessor which is accessible to both the common memory device and the primary memory device and that transfers the data processing program from the common memory device to the primary memory device via the data buses;

a bus control unit which includes an access permitting unit that permits the primary microprocessor access to the common memory device to control the data transfer on the buses by time sharing with reference to an access ON flag;

an interface having a register that stores the access ON flag; and a secondary memory device provided with a transfer completion setting unit, and when the transfer of a program from the secondary memory device to the common memory device is completed, the transfer completion setting unit establishes the ON flag indicative of the data transfer completion, on the register of the interface to open a gate of the access permitting unit to permit the primary microprocessor access to the common memory device via the bus control unit;

wherein the secondary memory device is provided with an overlay table search portion along with an overlay table including a list of data processing programs, the overlay table search portion is provided for searching a data processing program of the overlay table when the primary microprocessor is permitted access to the common memory by detecting that the ON flag is established by said transfer completion setting unit.

11. The memory exclusive control device as claimed in claim 10, wherein the common memory device stores a search of program of searching the overlay table transferred from the overlay table search portion of the secondary memory device, the search operation is program being executed when the primary microprocessor is permitted to access to the common memory device by detecting the establishment of the ON flag.

12. The memory exclusive control device as claimed in claim 10, wherein when the access ON flag is established by the transfer completion setting unit, the overlay table search portion obtains a size of the data processing program to be transferred to the primary memory device, a head address on the common memory device storing the data processing program and a head address on the primary memory device executing the data processing program, whereby, based on the obtained size of the data processing program, the head address on the common memory device storing the data processing program and the head address on the primary memory device executing the data processing program, a data amount of the data processing program corresponding to the size thereof is transferred from the head address on the common memory device to the head address on the primary memory device.

13. A memory exclusive control method for data transfer on buses in a data processing system that includes a primary microprocessor with a primary memory device and a secondary microprocessor, comprising:

storing a data processing program and a transfer program in a common memory device;

determining, by the secondary microprocessor, whether the primary microprocessor is allowed access to the common memory device by determining whether the storing of the data processing program and the transfer program to the common memory device is completed;

outputting, by the secondary microprocessor, a signal to allow the primary processor access to the common memory device when it is determined that the transfer of the data processing program and the transfer program to the common memory device is completed;

opening a gate of an access permitting unit according to the signal to permit the primary microprocessor access to the common memory device to control the data transfer on the buses;

executing, by the primary processor, the transfer program stored in the common memory device, without transferring the transfer program to the primary memory device, to transfer the data processing program from the common memory device to the primary memory device via the buses; and storing the data processing program to be executed on the primary memory device.

14. The memory exclusive control method as claimed in claim 13, wherein the step of permitting the primary microprocessor to access to the common memory device for controlling the data transfer on the buses is executed by time sharing with reference to an access ON flag.

15. A memory exclusive control method for data transfer on buses in a data processing system, comprising:

storing a data processing program and a transfer program in a common memory device;

establishing an ON flag without resetting a primary microprocessor when the storing is completed, to open a gate of an access permitting unit to permit the primary microprocessor access to the common memory device via a bus control unit;

permitting the primary microprocessor access to the common memory device to control the data transfer on the buses in accordance with the ON flag;

executing the transfer program to transfer the data processing program from the common memory device to the primary memory device via the buses, when the primary microprocessor is permitted access to the common memory device; and storing the data processing program to be executed on the primary memory device.

16. The memory exclusive control device as claimed in claim 15, wherein when the access ON flag is established by the transfer completion setting unit, the overlay table search portion obtains a size of the data processing program to be transferred to the primary memory device, a head address on the common memory device storing the data processing program and a head address on the primary memory device executing the data processing program, whereby, based on the obtained size of the data processing program, the head address on the common memory device storing the data processing program and the head address on the primary memory device executing the data processing program, a data amount of the data processing program corresponding to the size thereof is transferred from the head address on the common memory device to the head address on the primary memory device.

* * * * *

UNITED STATES PATENT AND TRADEMARK OFFICE
CERTIFICATE OF CORRECTION

PATENT NO.   : 6,233,663 B1
DATED        : May 15, 2001
INVENTOR(S)  : K. Yamamoto et al.

It is certified that error appears in the above-identified patent and that said Letters Patent is hereby corrected as shown below:

Column 12,
Line 45, after "processing" insert -- program --.

Column 13,
Line 30, after "search" delete "of".
Line 32, after "search" delete "operation is".

Signed and Sealed this

Sixteenth Day of April, 2002

Attest:

JAMES E. ROGAN
Attesting Officer              Director of the United States Patent and Trademark Office